US012580240B2

(12) United States Patent
Henzler et al.

(10) Patent No.: US 12,580,240 B2
(45) Date of Patent: Mar. 17, 2026

(54) BATTERY PACK FOR EXCHANGEABLE INSERTION INTO A RECEIVING COMPARTMENT

(71) Applicant: Andreas Stihl AG & Co. KG, Waiblingen (DE)

(72) Inventors: Andreas Henzler, Unterensingen (DE); Maria Pöhler, Waiblingen (DE); Andreas Wolf, Leutenbach (DE); Alexander Härtel, Ludwigsburg (DE); Jürgen Glaser, Lug (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 730 days.

(21) Appl. No.: 17/584,574

(22) Filed: Jan. 26, 2022

(65) Prior Publication Data

US 2022/0255155 A1      Aug. 11, 2022

(30) Foreign Application Priority Data

Feb. 9, 2021      (EP) ..................................... 21156041

(51) Int. Cl.
*H01M 10/613* (2014.01)
*B25F 5/00* (2006.01)
(Continued)

(52) U.S. Cl.
CPC ........... *H01M 10/613* (2015.04); *B25F 5/008* (2013.01); *B25F 5/02* (2013.01); *H01M 10/6235* (2015.04);
(Continued)

(58) Field of Classification Search
CPC ........... H01M 10/6551; H01M 10/613; H01M 10/653; H01M 50/204; H01M 50/224; H01M 10/6235; H01M 2220/30
See application file for complete search history.

(56) References Cited

U.S. PATENT DOCUMENTS 4,880,713 A * 11/1989 Levine ................... B25B 21/00
                                                                     429/96
6,537,694 B1    3/2003 Sugiura et al.
(Continued)

FOREIGN PATENT DOCUMENTS

DE    20 2019 105 238         1/2021

*Primary Examiner* — Ula C Ruddock
*Assistant Examiner* — Sydney L Kline
(74) *Attorney, Agent, or Firm* — Gudrun E. Huckett

(57) ABSTRACT

A battery pack for exchangeable insertion into a receiving compartment delimited by an inner wall has a housing accommodating battery cells. The housing has a basic shape with an upright side and first and second end walls opposite each other. The upright side extends in upright direction of the housing between the first and second end walls. The upright side has an outer surface and longitudinal ribs arranged thereon and extending in upright direction. The longitudinal ribs have a height measured in upright direction and are positioned at a distance from each other. The distance is measured transversely to the upright direction. The longitudinal ribs delimit together with the outer surface of the upright side a cooling groove extending in upright direction. The longitudinal ribs are designed along the height such that the cooling groove can delimit, together with the inner wall, a cooling channel extending in upright direction.

11 Claims, 5 Drawing Sheets

(51) Int. Cl.

| | |
|---|---|
| *B25F 5/02* | (2006.01) |
| *H01M 10/6235* | (2014.01) |
| *H01M 10/653* | (2014.01) |
| *H01M 10/6551* | (2014.01) |
| *H01M 10/6561* | (2014.01) |
| *H01M 50/204* | (2021.01) |
| *H01M 50/224* | (2021.01) |
| *H01M 50/247* | (2021.01) |

(52) U.S. Cl.
CPC ..... *H01M 10/653* (2015.04); *H01M 10/6551* (2015.04); *H01M 50/204* (2021.01); *H01M 50/224* (2021.01); *H01M 50/247* (2021.01); *H01M 10/6561* (2015.04); *H01M 2220/30* (2013.01)

(56) References Cited

U.S. PATENT DOCUMENTS

| | | | | |
|---|---|---|---|---|
| 2010/0218385 | A1 | 9/2010 | Mang et al. | |
| 2010/0218967 | A1* | 9/2010 | Roskamp | A01G 3/053 173/217 |
| 2012/0067608 | A1* | 3/2012 | Heinzelmann | B25F 5/02 173/217 |
| 2012/0070711 | A1* | 3/2012 | Souki | H01M 10/6566 429/120 |
| 2014/0319111 | A1* | 10/2014 | Jokinen | B23K 9/10 165/80.2 |
| 2016/0087319 | A1* | 3/2016 | Roh | H01M 10/6551 429/62 |
| 2019/0036091 | A1 | 1/2019 | Lee et al. | |
| 2019/0115638 | A1* | 4/2019 | Chen | H01M 50/103 |
| 2020/0006722 | A1* | 1/2020 | Tanner | H01M 10/6556 |
| 2020/0243931 | A1* | 7/2020 | Sakurai | H01M 10/6551 |

* cited by examiner

BATTERY PACK FOR EXCHANGEABLE INSERTION INTO A RECEIVING COMPARTMENT

BACKGROUND OF THE INVENTION

The invention relates to a battery pack configured for exchangeable insertion into a receiving compartment that is delimited by inner walls. The battery pack comprises a housing in which a plurality of battery cells are accommodated. The housing of the battery pack has a basic shape with upright sides and end walls, wherein the upright sides extend in an upright direction of the housing from one end wall of the housing to the other end wall of the housing.

It is known to operate electric power tools with an exchangeable battery pack that provides the required electrical power for operating the power tool. US 2012/0067608 discloses power tools in which the battery pack is to be inserted into a receiving compartment of the casing of the power tool so that the battery pack is partially or completely accommodated in the casing of the power tool.

On the one hand, battery packs are to provide a high energy density and, on the other hand, they should occupy only minimal installation space. In case of a battery pack with a compact configuration and high energy density, a sufficient heat dissipation must be ensured so that the individual battery cells installed in the battery pack do not suffer thermal damage when under electrical load. Battery packs can comprise cooling air openings in the housing for letting in and letting out cooling air with the goal of dissipating as much heat as possible. Openings in the housing of the battery pack however entail the risk of dirt ingress into the housing. Moreover, the openings in the walls of the housing may become clogged.

It is the object of the invention to design the housing of an exchangeable battery pack in such a way that a good heat dissipation can be obtained in operation of the battery pack. In particular, in case of a battery pack received in a receiving compartment of a power tool, an efficient heat dissipation is to be ensured.

SUMMARY OF THE INVENTION

In accordance with the invention, this is achieved for a battery pack of the aforementioned kind in that at the outer surface of an upright side of the housing at least two longitudinal ribs extending in the upright direction are provided and the longitudinal ribs are positioned at a distance, measured transversely to the upright direction, relative to each other, in that the longitudinal ribs together with the outer surface of the upright side delimit a cooling groove extending in the upright direction of the housing, and in that the longitudinal ribs in regard to their height are configured such that the cooling groove is suitable to delimit together with the inner wall of the receiving compartment a cooling channel extending in the upright direction of the battery pack.

According to the invention, the outer surface of the upright side of the housing comprises at least two longitudinal ribs extending in the upright direction and comprising a distance relative to each other that is measured transversely to the upright direction. The longitudinal ribs delimit together with the upright side of the housing a cooling groove which extends in the upright direction of the housing.

The longitudinal ribs arranged at an upright side increase the effective heat dissipation surface of the housing and thus already provide a good heat dissipation. The longitudinal ribs are configured moreover across their height in such a way that the cooling groove is suitable to delimit together with an inner wall of the receiving compartment a cooling channel extending in the upright direction of the battery pack. The longitudinal ribs have an identical height. In the receiving compartment, two longitudinal ribs, in particular neighboring ones, delimit respectively a cooling channel together with the outer surface of an upright side and together with the inner wall of the receiving compartment. The plurality of cooling channels embodied in this way by a plurality of longitudinal ribs ensure a targeted cooling air guiding action in the upright direction of the battery pack so that a good heat dissipation is ensured.

Expediently, cooling air is supplied in the power tool in the region of the bottom of the receiving compartment. The supplied cooling air, which is in particular forced in by a blower, for example, is distributed across the end wall of the housing of the battery pack which is positioned in the receiving compartment and flows at the level of the end wall into the cooling channels formed at the upright sides, respectively. The cooling air flows, guided through the cooling channel, from the end wall of the housing of the battery pack positioned in the receiving compartment to the oppositely positioned other end wall of the housing of the battery pack which is advantageously positioned outside of the casing of the power tool. In the region of the other end wall of the housing of the battery pack, the cooling air guided in the cooling channels exits into the environment.

In order to provide a surface area as large as possible for heat transfer, it is provided to arrange on an upright side a plurality of longitudinal ribs wherein a cooling groove is formed between two neighboring longitudinal ribs, respectively. The longitudinal ribs of an upright side are positioned at a distance relative to each other which is measured transversely to the upright direction. Advantageously, more than 50% of all longitudinal ribs of an upright side are positioned relative to each other at the same distance measured transversely to the upright direction. In an expedient embodiment, all longitudinal ribs are spaced at the same distance from each other. It can be advantageous to provide the longitudinal ribs at different spacings to each other.

In a particular embodiment, neighboring cooling grooves are separated from each other by only one longitudinal rib. A longitudinal rib forms thus a partition between two cooling grooves so that the longitudinal rib is subjected to cooling air on both longitudinal sides.

Advantageously, the cooling grooves of an upright side extend across the entire height of the base body of the housing of the battery pack. The cooling grooves extend from one end wall of the housing to the oppositely positioned end wall of the housing, in particular in parallel arrangement to each other.

In order to obtain a large effective surface area for heat transfer, it is provided that cooling grooves are formed across the entire width of an upright side.

In order to achieve a good heat transfer from the interior of the housing to the exterior, at least the upright sides of the housing are formed of a heat-conducting material. A material that conducts heat well and is in particular lightweight is aluminum or an aluminum alloy. Magnesium alloy is also suitable.

A simple construction of the housing of the battery pack is obtained in that at least one upright side of the housing is formed by a profile or section that is provided with outer longitudinal ribs. The profile or section can be advantageously an extruded profile (extruded section) which can be easily made to measure for assembly of a housing. The profile can also be a diecast profile (diecast section).

Advantageously, two neighboring upright sides of the base body of the housing form a common housing component so that the number of components for building the housing is reduced. The common housing component can be an L profile (L section) comprising outer longitudinal ribs or a U profile (U section) comprising outer longitudinal ribs. In this way, it can be achieved that the housing of the battery pack can be assembled of only two housing components for the upright sides and a respective end wall component for an end wall. The assembly expenditure is minimal.

In a further embodiment of the invention, an end wall of the housing is configured as a connection side of the battery pack, wherein electrical connection contacts for charging or discharging of the battery cells arranged in the housing are provided in the end wall. The other end wall of the housing opposite the connection side forms in particular an outwardly facing cover of the battery pack.

The end wall component which forms the bottom end wall comprises a rim whose outer dimensions correspond to the outer dimensions of the base body of the housing. In the rim, through openings are provided which can serve as inlet opening and/or outlet opening of a cooling groove.

In a particular embodiment of the invention, a power tool is provided with a receiving compartment into which a battery pack according to the invention is inserted. The battery pack is accommodated in the receiving compartment in such a way at least across the length of the cooling grooves in the upright direction that a cooling groove, at least across a portion of its length, delimits a cooling channel together with an inner wall of the receiving compartment. In this context, it can be sufficient when the inner wall of the receiving compartment is positioned near the open cooling groove. It is not mandatory, but may be advantageous, that the inner wall contacts the longitudinal ribs of the cooling groove. The distance between the inner wall of the receiving compartment and the longitudinal rims of the longitudinal ribs lies in the range of a few millimeters. Advantageously, the distance or the gap between the inner wall of the receiving compartment and the longitudinal rim of a longitudinal rib amounts to between 0.1 mm and 15 mm, preferably between 1 mm and 5 mm.

Further features of the invention result from the additional claims, the description, and the drawing in which an embodiment of the invention is illustrated. The features which are disclosed in the claims, in the description supra, and in the following figure description can be combined in any combination with each other within the concept of the invention.

DESCRIPTION OF PREFERRED EMBODIMENTS

Figure 1:
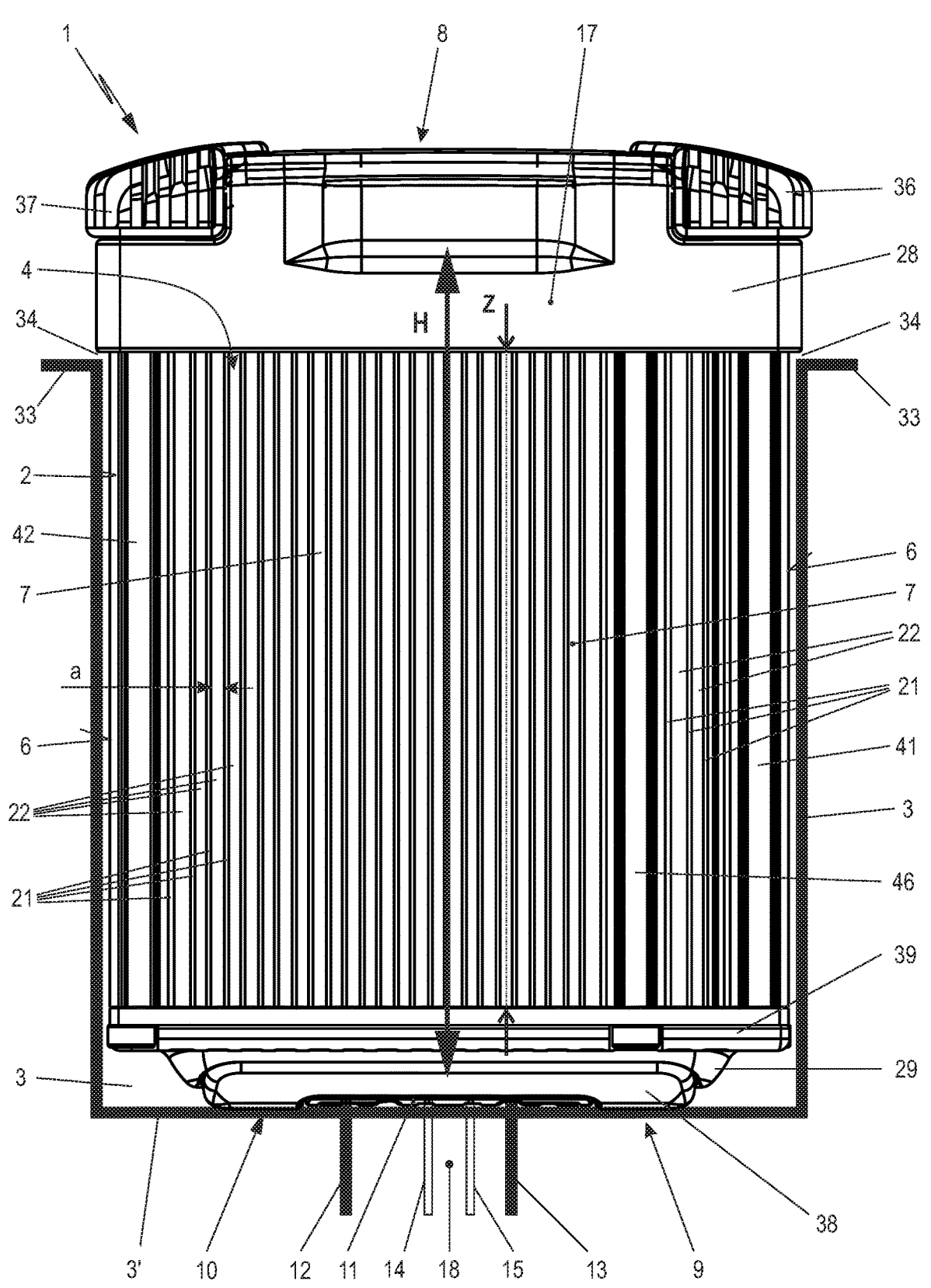
FIG. 1 is a side view of a battery pack according to the invention with a housing according to the invention.

The battery pack 1 illustrated in FIG. 1 comprises a housing 4 which is assembled of upright sides 6, 7 and of end walls 8, 9. The upright sides 6, 7 extend in upright direction H of the housing 4 from one end wall 8 to the other end wall 9. The end walls 8, 9 are positioned in particular at a right angle to the upright sides 6, 7 and form closure planes in relation to the upright direction H. In the housing 4, a plurality of battery cells 5 (FIG. 8) is arranged which together form a cell pack 19 (FIG. 4) providing an operating voltage at power output contacts 12, 13.

Figure 4:
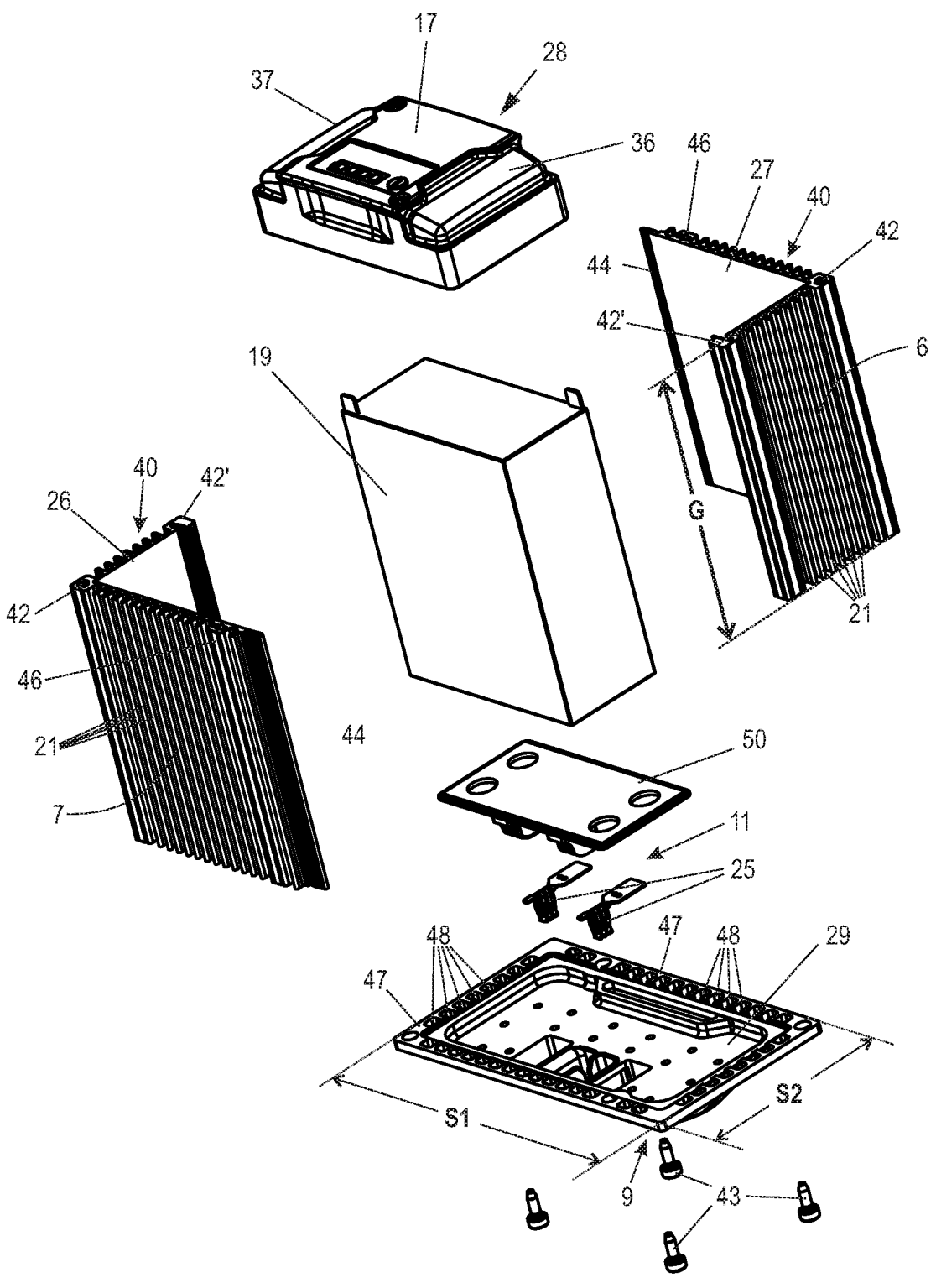
FIG. 4 is a schematic exploded view of the battery pack according to FIG. 1.

In the illustrated embodiment, an end wall 9 forms a connection side 10 of the battery pack 1. This connection side 10 is provided with connection contacts 11 which are formed expediently as contact jacks 25 (FIG. 4). The counter contacts 18 in the bottom 3' of the receiving compartment 3 are comprised of power output contacts 12, 13 for charging and/or discharging the cell pack 19 comprised of battery cells 5 as well as communication contacts 14, 15 for connecting the cell pack 19 to a monitoring electronics of a charge device or a power tool.

The principal configuration of the housing 4 is comprised of a base body 16 (FIG. 2) that is closed off by end wall components 28 and 29. The base body 16 of the housing 4 is illustrated in the section illustration according to FIG. 2. The base body 16 has a substantially rectangular cross section with upright sides 6 and 7, wherein the upright sides 7 form the wide sides of the base body 16 and the upright sides 6 the narrow sides of the base body 16.

Figure 2:
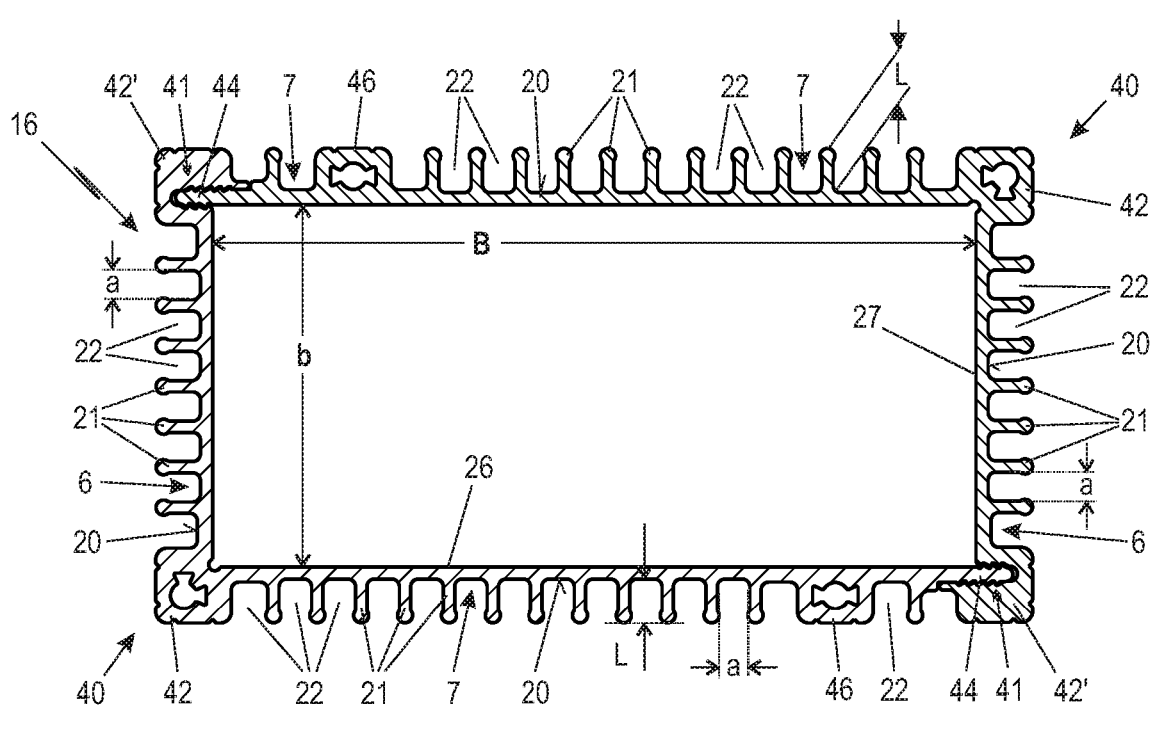
FIG. 2 is a cross section of the base body of the housing of the battery pack.
Figure 3:
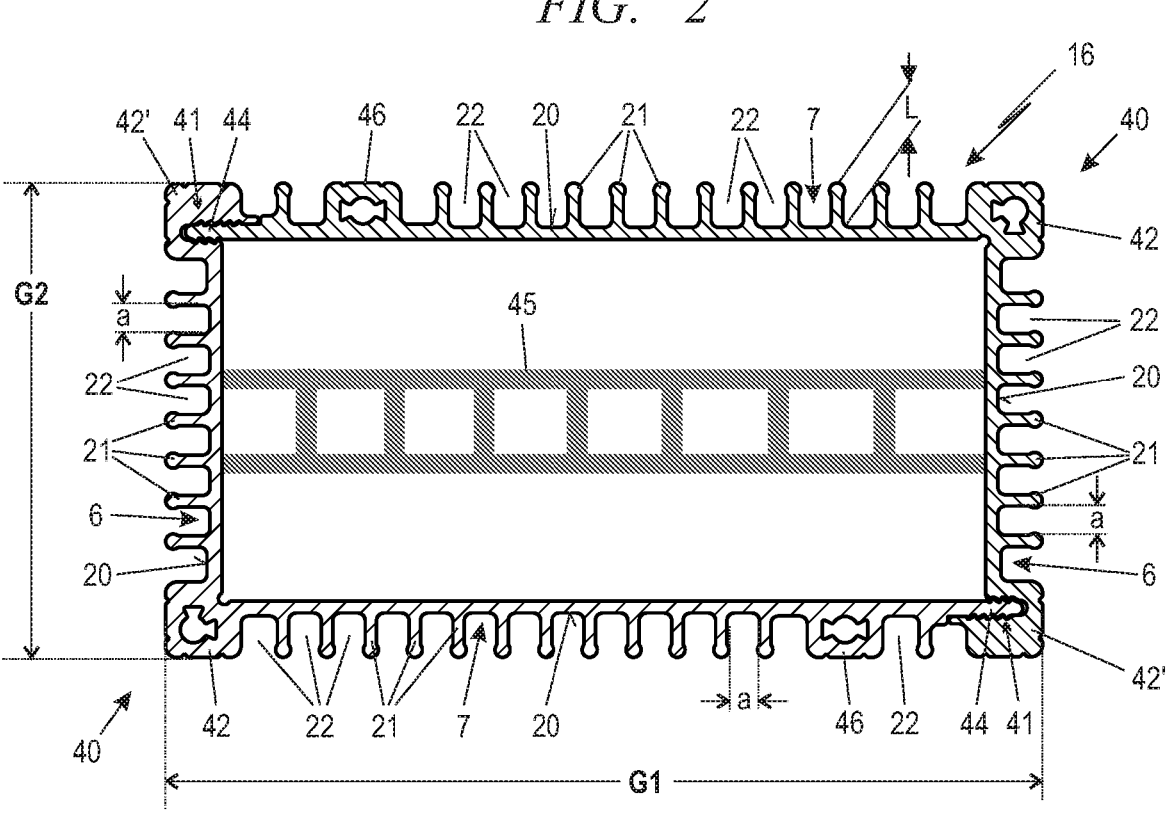
FIG. 3 is a cross section of the base body of the housing according to FIG. 2 with an optional reinforcement element arranged in the housing.

As illustrated in FIG. 2, at least two longitudinal ribs 21 are provided at the outer surface 20 of an upright side 6, 7 and extend in upright direction H (FIG. 1). The longitudinal ribs 21 are positioned at a distance a relative to each other. Between two neighboring longitudinal ribs 21, a cooling groove 22 is formed. As illustrated in FIGS. 1 to 3, a plurality of longitudinal ribs 21 are arranged, respectively, at an upright side 6, 7, i.e., on the narrow sides and the wide sides of the base body 16. Preferably, longitudinal ribs 21 are provided across the entire width b, B of an upright side 6, 7. Cooling grooves 22 are provided across the entire width b, B of an upright side 6, 7.

The plurality of the longitudinal ribs 21, in particular more than 50% of the longitudinal ribs 21 of an upright side 6, 7, are positioned at the same distance a relative to each other, the distance a being measured transversely to the upright direction H. It can be expedient to arrange the longitudinal ribs 21 with different distances relative to each other. In particular, the embodiment of the cooling grooves 22 on the outer surfaces 20 of the upright sides 6, 7 is provided such that neighboring cooling grooves 22 are separated from each other in particular by only one longitudinal rib 21.

Figure 8:
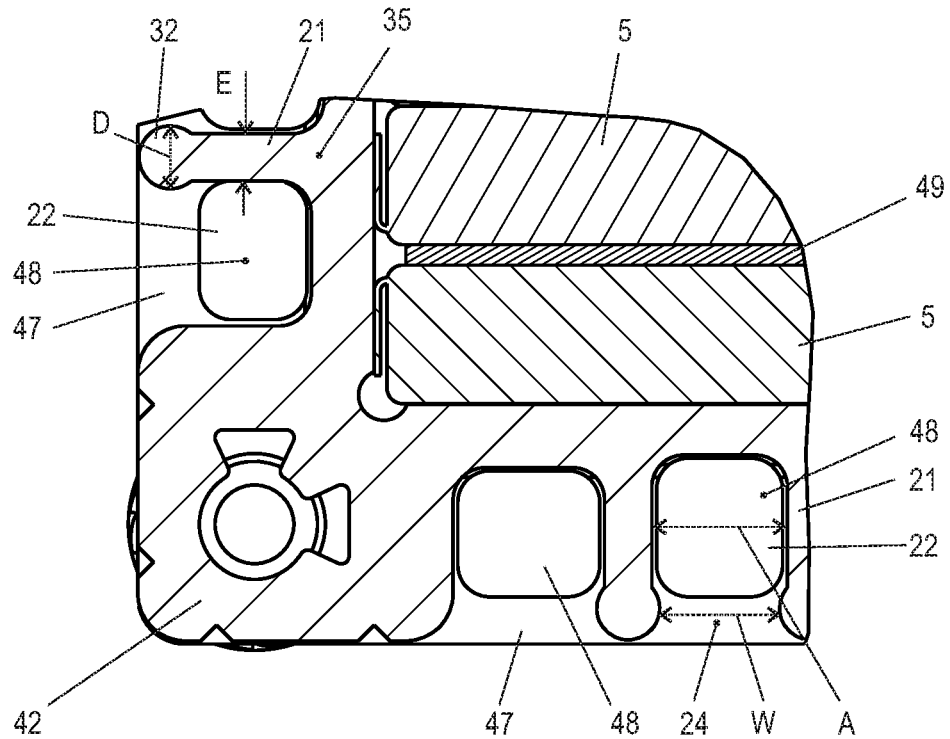
FIG. 8 is an enlarged illustration of the detail VIII of FIG. 7.

As is apparent from the enlarged illustration in FIG. 8, a longitudinal rib 21 has a base region 35 as well as a longitudinal rim 32. The cross section of a longitudinal rib 21 has a preferably rectangular basic shape wherein the height L of a longitudinal rib 21 is larger than its width. The longitudinal rim 32 of a longitudinal rib 21 is embodied wider than the web of the longitudinal rib 21 between the base section 35 and the longitudinal rim 32. The longitudinal rim 32 has an in particular round, preferably a circular, cross section. The diameter D of the cross section of the round longitudinal rim 32 is larger than the thickness E of the web between the base region 35 and the longitudinal rim 32. In this way, it is achieved that the opening width W of an opening of a cooling groove 22 between the longitudinal rims 32 of two neighboring longitudinal ribs 21 is smaller than the width A of a cooling groove 22 defined by the distance a. The cooling groove 22 comprises a constricted groove opening 24 which counteracts escape of cooling air guided in the cooling groove 22.

The cooling grooves 22 of an upright side 6, 7 extend from one end wall 9 of the housing 4 to the oppositely positioned other end wall 8. The cooling grooves 22 have a length Z (see FIG. 1) and extend preferably parallel to each other. The cooling grooves 22 are positioned in particular parallel to the upright direction H of the battery pack 1.

One end wall 9 of the housing 4 forms the connection side 10 of the battery pack 1 with the electrical connection contacts 18 while the oppositely positioned other end wall 8 of the housing 4 opposite the connection side 10 forms a cover 17 of the battery pack 1. The upright sides 6, 7 of the housing 4 are comprised of an in particular heat-conducting material. Preferably, the upright sides 6, 7 are comprised of aluminum or an aluminum alloy or a magnesium alloy. In a particular embodiment of the invention, the upright sides 6, 7 are formed by a profile (section) 40 comprising outer longitudinal ribs 21. The profile (section) 40 is preferably an extruded profile (extruded section). The individual profiles (sections) 40 can be joined preferably by a plug connection 41 in a captive manner. The plug connection 41 after joining is connected captively, in particular connected by friction fit or form fit. It can be advantageous to glue the plug connection 41.

In the illustrated embodiment, two neighboring upright sides 6, 7 of the housing 4 form a common housing component 26 or 27. The common housing component 26 or 27 can be designed as an L profile as illustrated in FIGS. 2 to 4 and 7. It can be expedient to form a common housing component as a U profile which, for formation of the base body 16 of the housing 4, is closed by a cover profile. Accordingly, the U profile can be comprised of two wide sides (upright sides 7) and a narrow side (upright side 6) wherein the cover profile then forms a narrow side (upright side 6) of the base body 16 of the housing 4. The U profile can however be formed also by a wide side (upright side 7) and two narrow sides (upright sides 6) wherein then the cover profile forms a wide side (upright side 7). Other configurations can also be expedient.

Advantageously, the housing 4 of the battery pack 1 is assembled of two housing components 26, 27 for the upright sides 6, 7 and a respective end wall component 28, 29 for an end wall 8, 9, respectively, as illustrated in FIG. 4, for example.

The base body 16, which is advantageously assembled of profiles (sections) 40, comprises posts 42 and 42' that are formed at the corners. The posts 42 are positioned in relation to the rectangular cross section diagonally opposite each other. Correspondingly, the posts 42' in relation to the rectangular cross section of the base body 16 are positioned diametrically opposite each other. In this context, the oppositely positioned posts 42 at the corners comprise a hollow core so that fastening screws 43 can be screwed into the posts 42 at the end face. Such fastening screws 43 are illustrated in FIG. 4 for connection of the end wall 9 to the base body 16 of the housing 4.

The oppositely positioned posts 42' are configured as plug-in receptacles of the plug connection 41. The longitudinal rim 44 of an upright side 6 or 7 of the base body 16 engages in the plug-in receptacle. In the illustrated embodiment, the longitudinal rim 44 of the wide side (upright side 7) engages the plug-in receptacle of the post 42'.

It can be expedient to arrange a reinforcement element 45 in the base body 16 of the housing 4 in order to increase the mechanical stiffness of the housing 4 in general. The reinforcement element 45 can extend across the entire height in upright direction H of the battery pack 1. The reinforcement element 45 can be utilized advantageously also for cooling air guiding or for guiding electrical lines.

Figure 5:
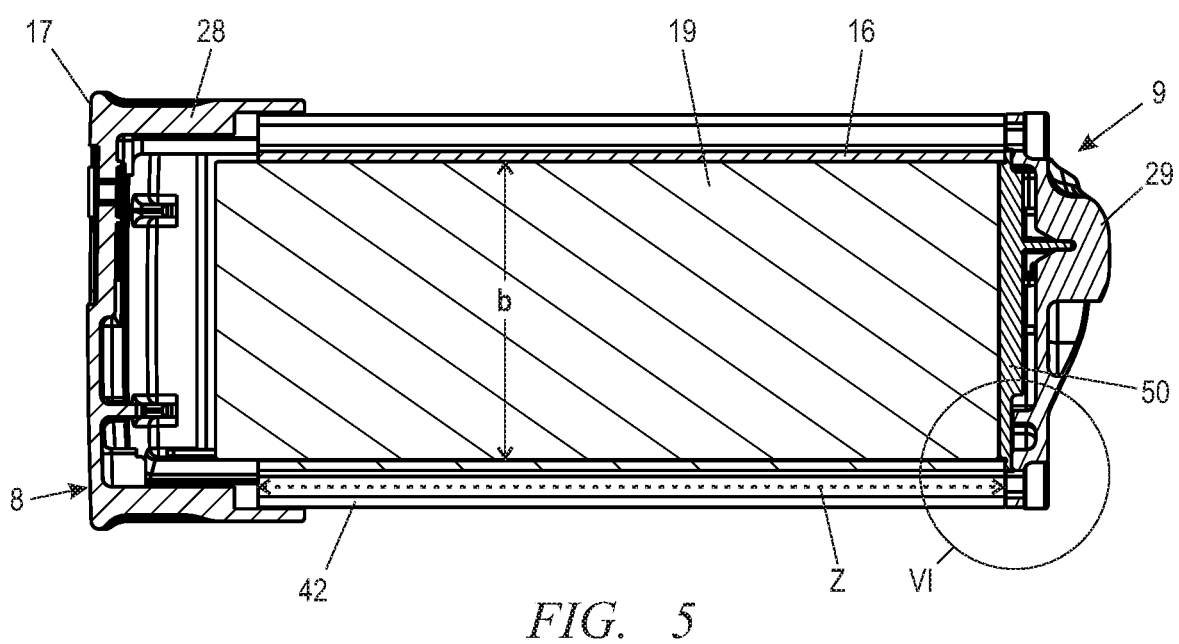
FIG. 5 is a longitudinal section of the battery pack from one end wall of the housing to the other end wall of the housing.
Figure 6:
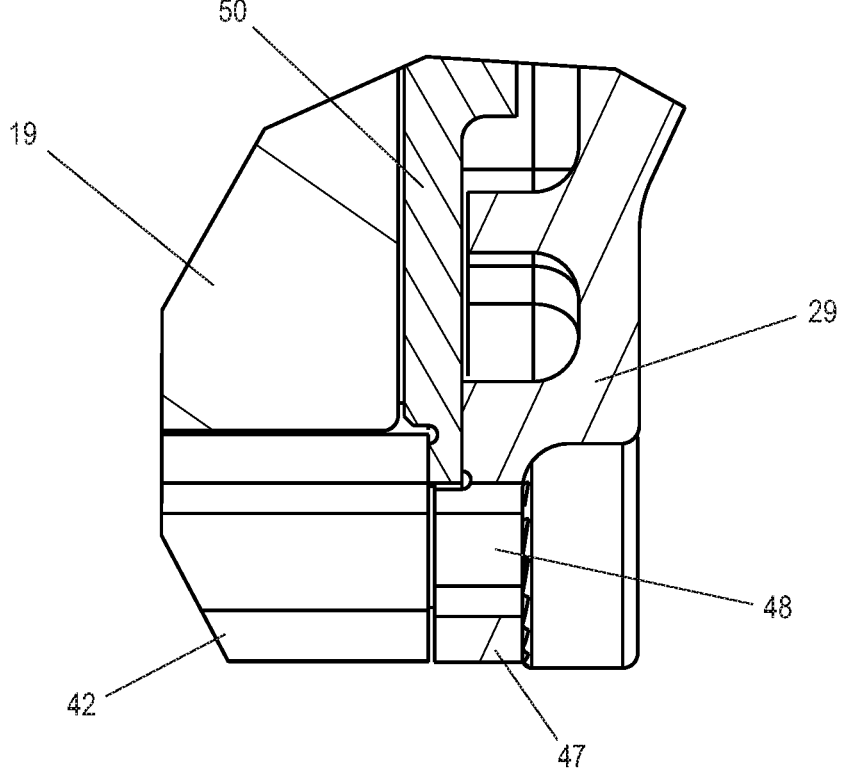
FIG. 6 is a detail view of the detail VI of FIG. 5.

As illustrated in FIG. 5, an end plate 50 of the end wall 9 is connected seal-tightly to the base body 16. In particular, the end plate 50 is contacting the bottom end of the upright sides 6, 7 but does not project past the outer surface 20 of the upright sides 6, 7. The end plate 50 is mechanically securely held by the end wall component 29 at the base body 16. The end wall component 29 is screw-connected by means of fastening screws 43 (FIG. 4) to the base body 16. The fastening screws 43 engage the hollow core of the posts 42 provided at the corners. Fastening elements cannot be screwed from the end face into the posts 42' because the posts 42' are designed as plug-in connection 41. Advantageously, it is therefore provided that, adjacent to a longitudinal rim 44 of the plug-in connection 41, a fastening post 46 is provided at the outer side 20 of an upright side 6, 7 and serves for screwing in fastening screws 43 from the end face. The fastening post 46 extends expediently across the entire height G (see FIG. 4) of the base body 16, in particular parallel to the posts 42 and 42'. The end wall component 29 can therefore be secured at four fastening points to the base body 16.

The base body 16 has a width G1 and a depth G2 (FIG. 3). The end wall component 29 has a width S1 and a depth S2 (FIG. 4). The configuration is selected such that the width S1 of the end wall component 29 corresponds to the width G1 of the base body 16 and the depth S1 of the end wall component 29 corresponds to the depth G2 of the base body 16. The end wall component 29 covers thus the ends of the cooling grooves 22. In the rim 47 of the end wall component 29, through openings 48 are provided, each being positioned congruently to a cooling groove 22. The through openings 48 formed in the rim 47 of the end wall component 29 form an end of a cooling rib 22 at the end wall.

As illustrated in FIG. 5, the end wall component 28 forming a cover 17 engages across the base body 16, wherein the cooling grooves 22 terminate in the end wall component 28 of the cover 17. It can be expedient to discharge cooling air that is flowing via the cooling grooves 22 into the cover 17 through cooling air outlet openings provided in the cover 17. The cooling air flowing into the cover 17 can also be utilized for cooling electronics components arranged in the cover.

FIG. 1 shows schematically the battery pack 1 that is inserted across a large portion of its length into the receiving compartment 3 of a power tool. The electrical contacting of the battery pack 1 with the power tool is realized by means of the connection contacts 18 arranged in the bottom 3' of the receiving compartment 3. As illustrated in an exemplary fashion, the battery pack 1 is accommodated across approximately 60% to 90% of its length in the receiving compartment 3. Advantageously, a gap 34 is formed between the bottom rim 31 of the end wall component 28 forming the cover 17 and the top circumferential rim 33 of the receiving compartment 3.

Figure 7:
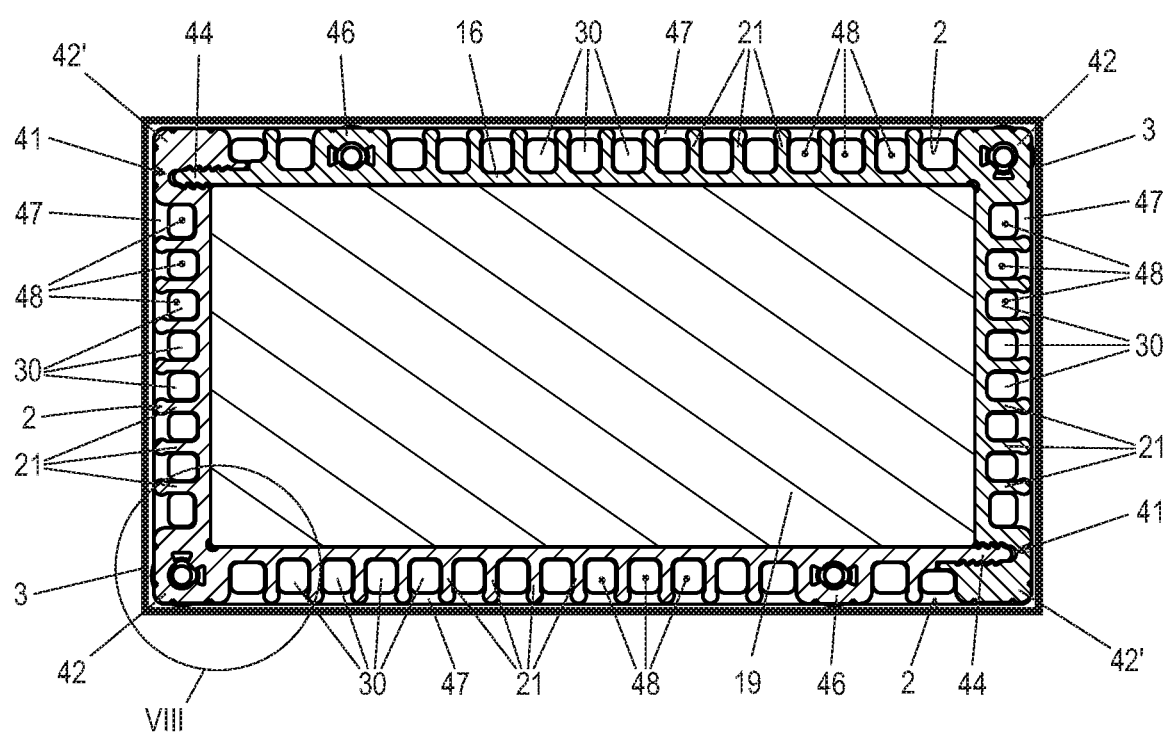
FIG. 7 is a schematic cross section of a battery pack received in a receiving compartment.

The longitudinal ribs 21 have a height L that is configured such that the cooling groove 22 is covered by the inner wall 2 (FIGS. 1 and 7). In this way, a cooling groove 22 becomes a cooling channel 30 which begins in the region of the bottom 3' of the receiving compartment 3 and extends to the end wall component 28 which forms the cover 17. For forming the cooling channel 30, a seal-tight contact of the inner wall 2 of the receiving compartment 3 at the longitudinal rims 32 of the longitudinal ribs 21 is not required. It is sufficient when the inner wall 2 is positioned at a minimal distance relative to the longitudinal ribs 21. The smaller the distance of the inner wall 2 relative to the longitudinal ribs 21, the better the realization of a directed cooling air flow from the bottom 3' of the receiving compartment 3 to the upper end wall 8 of the battery pack 1. Expediently, the size of the gap between the longitudinal rim 32 of a longitudinal rib 21 and the inner wall 2 of the receiving compartment 3 lies within a range of 0.1 mm to 15 mm. A particularly good cooling performance is achieved when the gap has a size of 0.1 mm to 5 mm, in particular a size of 0.2 mm to 3 mm.

It can be advantageous to supply cooling air in the region of the bottom 3' of the receiving compartment 3, for example, by means of a blower, so that the supplied cooling air is discharged from the receiving compartment 3 via the cooling channels 30 and advantageously through the gap 34 at the top rim of the receiving compartment 3. The described configuration of the base body 16 of the battery pack also provides for a convection flow due to the air being heated in the cooling grooves 22 and rising to the circumferential rim 33 of the receiving compartment 3. Due to the targeted cooling air guidance by means of the cooling grooves 22 or the cooling channels 30, formed in interaction with the interior wall 2 of the receiving compartment 3, a good heat dissipation of the waste heat of the cell pack 19 produced in operation is ensured.

The oriented cooling air guidance is obtained in particular by the interaction of the inner wall 2 of the battery compartment 3 with the special outer configuration of the housing 4 with cooling grooves 22. The battery pack 1 is inserted into the receiving compartment 3, delimited by inner walls 2, of a power tool wherein the battery pack 1 comprises a housing 4 in which a plurality of battery cells 5 are accommodated. The closed housing 4 of the battery pack 1 has a base body 16 with upright sides 6, 7 and end walls 8, 9. In this context, advantageously one end wall 9 of the housing 4 is configured as a connection side 10 of the battery pack 1. Expediently, at this end wall 9 of the housing 4 that forms the connection side 10, electrical connection contacts 11 are provided. Such connection contacts 11 can serve, for example, for charging or discharging the battery cells 5 which are arranged in the housing 4. The upright sides 6, 7 of the housing 4 extend from one end wall 9 in an upright direction H to the other end wall 8 of the housing 4. Since at least two longitudinal ribs 21 extending in upright direction H are provided at the outer surface 20 of an upright side 6, 7 of the housing 4 and the longitudinal ribs 21 are positioned at a distance a relative to each other that is measured transversely to the upright direction H, the longitudinal ribs 21 delimit, together with the upright sides 6, 7, cooling grooves 22 extending in upright direction H of the housing 4 and comprising a length Z (see FIG. 1). The longitudinal ribs 21 are configured in respect to their height L such that the cooling groove 22, together with the inner wall 2 of the receiving compartment 3, forms a cooling channel 30 extending in the upright direction H of the battery pack 1.

Advantageously, the battery pack 1 is provided with bumpers 36, 37, 38, 39 of elastic material which are designed to weaken impact loads on the battery pack 1. For example, the end wall component 28 which forms the cover 17 is provided at the narrow sides with bumpers 36 and 37. The end wall component 29 which forms the connection side 10 comprises an outer bumper 38. Moreover, the bottom end wall component 29 comprises a frame bumper 39.

As illustrated in FIGS. 7 and 8, the interior of the housing 4 is provided with battery cells 5 in a tight arrangement. The battery cells 5 are advantageously lithium cells, for example, in the form of pouch cells. These cells change their volume depending on their charge state; for this reason, an elastic layer 49 is advantageously provided that is arranged between two neighboring battery cells 5 (FIG. 8). These elastic layers 49 can be comprised, for example, of material that conducts heat well in order to achieve also a good heat transfer to the outer walls of the battery pack. The elastic layer 49 can be in particular cellular rubber, in particular cellular rubber that conducts heat well.

The specification incorporates by reference the entire disclosure of European priority document 21 156 041.2 having a filing date of Feb. 9, 2021.

While specific embodiments of the invention have been shown and described in detail to illustrate the inventive principles, it will be understood that the invention may be embodied otherwise without departing from such principles.

What is claimed is:

1. A battery pack received in a receiving compartment delimited by an inner wall; the battery pack comprising:

a housing accommodating battery cells, wherein the housing comprises a basic shape with an upright side, a first end wall, and a second end wall opposite the first end wall, wherein the upright side extends from the first end wall to the second end wall in an upright direction of the housing;

wherein the upright side comprises an outer surface and further comprises two or more longitudinal ribs arranged on the outer surface and extending in the upright direction, wherein the longitudinal ribs each comprise a height measured in the upright direction of the housing;

wherein the longitudinal ribs are positioned at a distance relative to each other, wherein the distance is measured transversely to the upright direction, wherein the longitudinal ribs delimit together with the outer surface of the upright side a cooling groove extending in the upright direction;

wherein the longitudinal ribs are configured along the height such that the cooling groove delimits, together with the inner wall of the receiving compartment, a cooling channel extending in the upright direction, wherein, in relation to the upright direction, the battery pack is received in the receiving compartment at least across a length of the cooling groove;

wherein a distance between the inner wall of the receiving compartment and longitudinal rims of the longitudinal ribs lies within a range of 0.1 mm and 15 mm;

wherein the housing comprises two of the upright sides, wherein the two upright sides neighbor each other and form a common housing component;

wherein the common housing component is an L profile or a U profile comprising the longitudinal ribs;

wherein the housing comprises two of the common housing components;

wherein the housing is assembled of said two common housing components, a first end wall component forming the first end wall and connected to said two common housing components, and a second end wall component forming the second end wall and connected to said two common housing components;

wherein a plurality of the longitudinal ribs are provided delimiting together with the outer surface of the upright side a plurality of the cooling grooves, wherein each of the plurality of the cooling grooves is delimited between two of the longitudinal ribs neighboring each other, respectively, wherein the distance measured transversely to the upright direction is the same for more than 50% of the plurality of the longitudinal ribs;

wherein the first end wall component or the second end wall component comprises a circumferential rim and the circumferential rim comprises through openings, each one of the plurality of cooling grooves having one of the through openings positioned congruently thereto, wherein the through openings form an inlet opening and/or an outlet opening of the plurality of cooling grooves.

2. The battery pack according to claim 1, wherein the plurality of the cooling grooves neighboring each other are separated from each other by only one of the longitudinal ribs, respectively.

3. The battery pack according to claim 1, wherein the plurality of the cooling grooves extend parallel to each other from the first end wall to the second end wall.

4. The battery pack according to claim 1, wherein the plurality of the cooling grooves are arranged across an entire width of the upright side of the housing.

5. The battery pack according to claim 1, wherein the upright side of the housing is formed of a heat-conducting material.

6. The battery pack according to claim 5, wherein the heat-conducting material is aluminum, an aluminum alloy, or a magnesium alloy.

7. The battery pack according to claim 1, wherein the upright side of the housing is formed by a profile provided with the longitudinal ribs.

8. The battery pack according to claim 7, wherein the profile is an extruded profile or a diecast profile.

9. The battery pack according to claim 1, wherein the first end wall of the housing is configured as a connection side of the battery pack and comprises electrical connection contacts, wherein the second end wall of the housing forms a cover of the battery pack.

10. A battery pack in a receiving compartment delimited by an inner wall; the battery pack comprising:

a housing accommodating battery cells, wherein the housing comprises a basic shape with upright sides, a first end wall, and a second end wall opposite the first end wall, wherein the upright sides extend from the first end wall to the second end wall in an upright direction of the housing, respectively;

wherein one of the upright sides comprises an outer surface and two or more longitudinal ribs arranged on the outer surface;

wherein the longitudinal ribs are positioned at a distance relative to each other;

wherein the longitudinal ribs delimit, together with the outer surface of said one of the upright sides, a cooling groove;

wherein the longitudinal ribs are configured along a height thereof such that the cooling groove is configured to delimit, together with the inner wall of the receiving compartment, a cooling channel;

wherein the cooling groove extends in the upright direction of the housing and, together with the inner wall of the receiving compartment, forms the cooling channel extending in the upright direction of the battery pack;

wherein at least one of the upright sides of the housing is comprised of a first heat-conducting material selected from aluminum, an aluminum alloy, or a magnesium alloy;

wherein, between the battery cells neighboring each other, an elastic layer of a second heat-conducting material is arranged, wherein the second heat-conducting material conducts heat and achieves a heat transfer to the outer walls of the battery pack.

11. A battery pack in a receiving compartment delimited by an inner wall; the battery pack comprising:

a housing accommodating battery cells, wherein the housing comprises a basic shape with upright sides, a first end wall, and a second end wall opposite the first end wall, wherein the upright sides extend from the first end wall to the second end wall in an upright direction of the housing, respectively;

wherein the first end wall of the housing is configured as a connection side of the battery pack and comprises electrical connection contacts, wherein the second end wall of the housing forms a cover of the battery pack;

wherein the upright sides include two neighboring upright sides forming a common housing component of the housing;

wherein one of the upright sides comprises an outer surface and two or more longitudinal ribs arranged on the outer surface;

wherein the common housing component is an L profile comprising the longitudinal ribs or a U profile comprising the longitudinal ribs;

wherein the housing is assembled of two of said common housing components for the upright sides, a first end wall component forming the first end wall, and a second end wall component forming the second end wall;

wherein the longitudinal ribs are positioned at a distance relative to each other, wherein the distance is measured transversely to the upright direction;

wherein the longitudinal ribs delimit together with the outer surface of the upright side a cooling groove extending in the upright direction;

wherein the longitudinal ribs are configured along the height thereof such that the cooling groove is configured to delimit, together with the inner wall of the receiving compartment, a cooling channel extending in the upright direction;

wherein the first end wall component or the second end wall component comprises a rim and the rim comprises through openings forming an inlet opening and/or an outlet opening of the cooling groove, respectively;

wherein the battery pack comprises bumpers of elastic material configured to weaken impact loads on the battery pack.

* * * * *